United States Patent [19]
Butler et al.

[11] Patent Number: 6,094,487
[45] Date of Patent: Jul. 25, 2000

[54] APPARATUS AND METHOD FOR ENCRYPTION KEY GENERATION

[75] Inventors: Theodore Butler, Morris Plains; Marcus Wong, Piscataway, both of N.J.

[73] Assignee: AT&T Corporation, New York, N.Y.

[21] Appl. No.: 09/034,823

[22] Filed: Mar. 4, 1998

[51] Int. Cl.[7] .................................................. H04K 1/00
[52] U.S. Cl. .......................... 380/270; 380/273; 380/274; 380/43; 380/278; 380/279; 380/283; 455/410; 455/411
[58] Field of Search .................................... 380/247–249, 380/259, 260, 262, 273, 270, 43, 278, 279, 283

[56] References Cited

U.S. PATENT DOCUMENTS

| | | | |
|---|---|---|---|
| 5,153,919 | 10/1992 | Reeds, II et al. | 380/44 |
| 5,204,902 | 4/1993 | Reeds, III et al. | 380/23 |
| 5,282,250 | 1/1994 | Dent et al. | 380/23 |
| 5,363,448 | 11/1994 | Koopman, Jr. et al. | 380/23 |
| 5,377,267 | 12/1994 | Suzuki et al. | 380/23 |
| 5,455,863 | 10/1995 | Brown et al. | 380/23 |
| 5,491,749 | 2/1996 | Rogaway | 380/21 |
| 5,491,750 | 2/1996 | Bellare et al. | 380/21 |
| 5,537,474 | 7/1996 | Brown et al. | 380/23 |
| 5,596,641 | 1/1997 | Ohashi et al. | 380/23 |
| 5,642,401 | 6/1997 | Yahagi | 379/58 |
| 5,661,806 | 8/1997 | Nevoux et al. | 380/25 |
| 5,940,512 | 8/1999 | Tomoike | 380/25 |
| 5,943,425 | 8/1999 | Mizikovsky | 380/25 |

*Primary Examiner*—Tod R. Swann
*Assistant Examiner*—Paul E. Callahan
*Attorney, Agent, or Firm*—Oliff & Berridge, PLC

[57] ABSTRACT

An encryption key generation system generates encryption keys at both an originating terminal and a terminating terminal of a wireless network. A central controller generates a shared secret based on the identification information of a requesting terminal and a first number, which may be random. The central controller broadcasts the first number to all terminals. A second number is generated by the central controller incorporating the shared secret data and the terminating terminal's identification information. The requesting terminal generates the shared secret data using the first number and predetermined algorithms and generates an encryption key based on the first number and the shared secret data. The terminating terminal decodes the shared secret data from the second number, and generates the same encryption key using the first number and the shared secret data.

21 Claims, 5 Drawing Sheets

APPARATUS AND METHOD FOR ENCRYPTION KEY GENERATION

BACKGROUND OF THE INVENTION

1. Field of Invention

This invention relates to generating encryption keys at both the originating and terminating terminals of a wireless network, and particularly the generation of the same encryption key at both terminals.

2. Description of Related Art

To secure private communications between devices over public frequency bands, signals are generally encrypted. While numerous cryptographic methods exist, authentication of the devices and distribution of authentication keys to prevent theft of the key has been a problem.

One method for authentication has been the challenge/response protocol based on a private key cryptographic algorithm. An individual subscriber unit (ISU) is issued a secret key, such as an authentication key (A-key), which is known only to the ISU and the service provider control center. The A-key is a cryptographic key variable stored in the memory of an ISU, and is generally entered into the ISU memory once when the ISU is first put into service. The A-key remains unchanged unless it is determined by a user or service provider that the value of the A-key has been compromised. Intermediate ISU cryptovariables, known as shared secret data (SSD), are generated from the unique and private ISU A-key.

Most private key encryption techniques, such as Data Encryption Standard (DES) use keys, such as the A-key, generated at a central location. The keys are distributed over the airwaves to ISUs. However, the distribution of keys over the airwaves offers an interloper the opportunity to obtain the keys and other relevant ISU identification information. The interloper can then program the intercepted information into an imitation ISU, resulting in an imitation ISU impersonating the original ISU. While impersonating an original ISU, the interloper can fraudulently obtain wireless services or retrieve otherwise private voice, data or video communications.

When it has been discovered that the key has been compromised, a new key must be distributed to the compromised ISU. The easiest and fastest way to distribute the new key from the control center is by transmitting the new key over the airwaves which is subject to interlopers, as discussed above. Thus, new technology is required to reduce this risk of interception of the encryption key.

SUMMARY OF THE INVENTION

An encryption key generation system of this invention provides for generating identical encryption keys at both an originating and a terminating individual subscriber unit (ISU) without sending the encryption keys over wireless networks. The encryption key generation system includes a control center that maintains information such as station identifications, authentication keys and smart card identifications corresponding to each of the ISUs. The control center periodically broadcasts a first number to the ISUs for authentication and shared secret data generation. The first number may be a pseudo-random number generated using a random number generator or retrieved from a look-up table. The first number is received by the ISUs and stored in memory. Each ISU is equipped with enough memory to store at least one first number.

When an originating ISU desires to communicate, it sends an ISU request to the control center to initiate service. Upon receipt of the ISU request, the control center retrieves from a database identification parameters corresponding to the requesting ISU and compares these parameters to parameters included with the received request. If the parameters match, the control center sends an authorization signal to the originating ISU over the airwaves, for example.

The originating ISU and the control center then generate a first shared secret data (SSD) based on the first number and the ISU identification parameters which include the originating ISU's authentication key. The first SSD generated by the originating ISU and a second SSD generated by the control center are identical because the same parameters and algorithm are used.

The control center also generates a second number based on the second SSD, and identification parameters corresponding to a terminating ISU identified in the ISU request. The terminating ISU generates a third SSD that is identical to the first SSD using the information contained in the second number, the terminating ISU's identification parameters, and the terminating ISU's authentication key. To transmit data, both the originating and the terminating ISUs encrypt the data using a first encryption key and a second encryption key, respectively. The first and second encryption keys are generated by the respective ISU's based on the first and third SSDs and the first number. The first and second encryption keys are identical because the first and third SSDs and the encryption key generation algorithms are identical. In this manner, identical encryption keys are generated by both the original ISU and the terminating ISU without ever exposing the encryption key over the airwaves. Accordingly, communication may be obtained with greater security.

BRIEF DESCRIPTION OF THE DRAWINGS

The preferred embodiments of this invention are described in detail with reference to the following figures wherein like numbers represent like elements, and wherein.

DETAILED DESCRIPTION OF PREFERRED EMBODIMENTS

Figure 1:
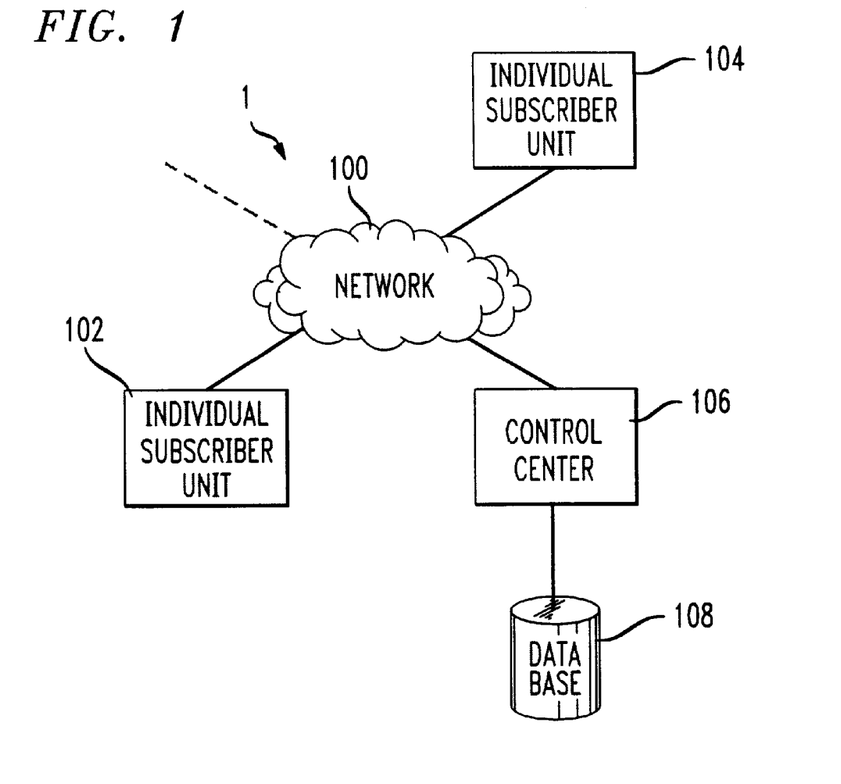
FIG. 1 is a block diagram of an encryption key system.

FIG. 1 is a block diagram of an encryption key generation system 1 that includes a plurality of individual subscriber units (ISUs) 102, 104 coupled to a network 100 and a control center 106 also coupled to the network 100. Each ISU 102, 104 can transmit and/or receive data, video, voice, or other communication transmissions. The encryption key generation system 1 provides for secure communications by passing shared secret data (SSD) instead of encryption keys among the ISUs. The SSD is an intermediate cryptovariable that may be formatted into fields. For example, an SSD_A field may be used to support authentication and an SSD_B field may be used to support the generation of encryption keys. Additional SSD fields may also be created for other purposes.

While FIG. 1 shows the ISUs 102, 104 as separate units, the ISUs 102, 104 may be the same physical unit. An example could be a table-top unit for the descrambling of video signals sent by a cable supplier to a home. The control center 106 has access to a security database 108 which contains information relating to the ISUs 102, 104, such as identification numbers of the ISU's, smart card identification numbers, and authentication key numbers which are required to generate the SSD, for example. When the ISUs 102, 104 are the same unit, the above numbers may be identical for both the originating and terminating ISUs 102, 104.

The control center 106 coordinates communications between the ISUs 102, 104 by broadcasting a first number and a second number. The control center 106 broadcasts the first number on a periodic basis and broadcasts the second number only in response to a valid request. The periodicity of the first number generation and broadcasts may be in increments of less than a second to minutes, hours, days or months. The frequency of the first number distribution will depend on the nature of the system. For example, a computer network may require first number updates less frequently than a cellular phone network which requires an update every few minutes.

Following receipt of the first number by the ISU 102, 104, the first number is placed into a memory 304. See FIG. 2. The memory may store more than one first number. The ISUs 102, 104 may use the SSD_A field of the SSD to determine which first number in the memory to utilize. For example, ISU 102 may be the sending ISU, and ISU 104 may be the receiving ISU. When a new first number is broadcast by the control center 106 after the ISU 102 is authorized, ISU 104 may need to retrieve a previous first number from memory. The ISU 104 selects an appropriate first number based on the SSD_A generated using the second number and ISU 104s' information (i.e. authentication identification numbers).

Figure 2:
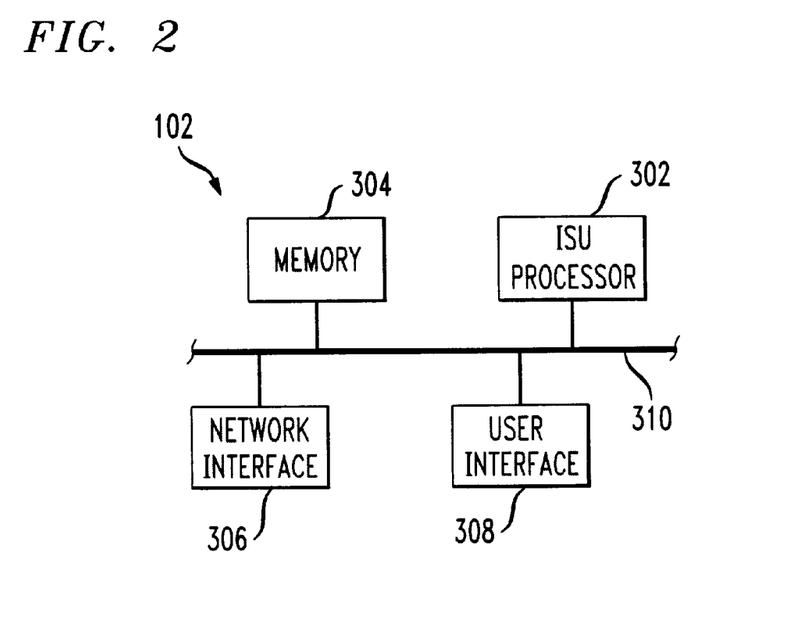
FIG. 2 is a block diagram of an individual subscriber unit.

If the generated encryption keys are not identical, then ISU 104 will not be able to decipher a received message. This condition may be caused by either a malfunction of the control center 106, and the ISUs 102, 104 or ambiguity between successive first numbers broadcasted by the control center 106. If this occurs, the ISU 102, 104 may be able to retrieve from memory 304 another stored first number and regenerate the encryption key.

In an exemplary embodiment, the first number is a pseudo-random number generated by well known techniques, for example, Blum-Micali Random Number Generator or Rivest-Shamir-Adleman (RSA) Random Number Generator. The second number is generated based on information contained in the valid request and ensures that communicating ISUs 102, 104 can generate identical encryption keys without transmitting the encryption keys.

When the ISU 102 desires to communicate with ISU 104, the ISU 102 sends the request to the control center 106. The control center 106 returns an authorization signal to the ISU 102, generates the second number, and sends the second number to the ISU 104. The ISUs 102, 104 generate two identical encryption keys based on the first and second numbers. The encryption keys are then used to encrypt and decipher data transmitted between the ISUs 102, 104 for secure communications.

FIG. 2 is a block diagram of an ISU such as the ISUs 102, 104. The ISU includes an ISU processor 302, a memory 304, a network interface 306 and a user interface 308. The above components are coupled together through a signal bus 310. For the following discussion, components of the ISU 102 are referenced using numerals shown in FIG. 2 and components of the ISU 104 are referenced using the same numerals but primed. For example, ISU processor 302 belongs to ISU 102, while ISU processor 302' belongs to ISU 104.

The ISU processor 302 performs calculations necessary to encrypt, decipher, or otherwise process information which is received or transmitted. The memory 304 maintains information pertaining to the ISU 102, such as an authentication key, the ISU identification, a smart card identification, and the first and second numbers received from the control center 106. The network interface 306 allows the ISU 102 to communicate with the network 100. User interface 308 permits a user to interface with the ISU 102.

ISUs 102, 104 may contain a smart card device. The smart card may be a separate component of the ISUs 102, 104, and may be removable. Smart cards are becoming commonplace for use with electronic devices where a user desires a higher level of identification protection in order to make theft of service more difficult. The smart card is typically equipped with an electronic storage device for storing additional identification information. When an instruction is received through the user interface 308 to transmit information to the ISU 104, the ISU processor 302 generates a request that contains the ISU 102 identification (station ID), the smart card identification (smart card ID) and an authentication key (A-key) and sends the request to the control center 106 through the network interface 306. The request may also include the first number. Generation of the request may utilize any well known algorithm for generating authentication requests, including Secure Hash Algorithm (SHA), or commercially available hashing algorithms such as MD2, MD4 or MD5 available from RSA Data Securities, Inc. Use of a hashing algorithm to convert at least the station ID, smart card ID and A-key to a signature is preferred, but is not required. After receiving the request, the control center 106 validates the request by comparing the station ID, the smart card ID and the A-key with the data in the database 108. If valid, the control center 106 returns an authorization signal to the ISU 102.

When the authorization is received from the control center 106 through the network interface 306, the ISU processor 302 generates a first SSD using the first number, the station ID, the smart card ID and the A-key. The first SSD maybe a numerical sequence generated using a predetermined algorithm. For example, $$\left[\frac{A+B}{C}\right] \cdot (X) = SSD \qquad (1)$$

where A, B and C are ISU identification, smart card ID, and authentication key, respectively, X is one of the first numbers stored in ISU memory 304, and +,/ and · are arithmetic operations. The SSD may include SSD_A, SSD_B, or any other SSD field by simply concatenating additional information to the above SSD, for example. The ISU 102 generates an encryption key based on the SSD of equation (1) and X. The encryption key may be generated by simply adding the SSD to X:

Encryption key=$SSD+X$ (2)

or more complex algorithms may be used such as

Encryption key=$f(SSD)+g(X)$ (3)

where f and g are complex mathematical expressions. The functions f and g may be stored in ISU memory 304, and may be updated periodically by the control center 106. Additionally, for the encryption key to be generated at any ISU 102, 104 when required, all ISUs in the network 100 must have the same functions f and g.

The control center 106 also generates a second SSD which is identical in value to the first SSD generated by the ISU 102, using the same algorithms and parameters as the ISU 102. The control center 106 further generates the second number and transmits the second number to the ISU 104. In order to generate the second number, the control center 106 generates the second number by first retrieving the station ID, the smart card ID, and the A-key of the ISU 104 from the database 108. Then, the control center 106 generates the second number using a predetermined algorithm. For example, $$\left[\frac{D+E}{F}\right] \cdot (\text{second } SSD) = \text{second number} \quad (4)$$

where D, E, and F are station ID, smart card ID, and A-key of the ISU 104, respectively.

The ISU processor 302' of the ISU 104 receives the second number from the control center 106 and generates the third SSD. If the second number of the equation (4) was received, then the ISU processor 302' uses its station ID (D), the smart card ID (E), an the A-key (F) to generate the third SSD. For example, $$\text{third } SSD = \left[\frac{F}{D+E}\right] \cdot (\text{second number}). \quad (5)$$

Thus, as shown by equations (4) and (5) the second SSD is identical to the third SSD, and because the second SSD is identical to the first SSD, and the third SSD is identical to the first SSD.

As a result of the above, both the ISU 102 and the ISU 104 have the same SSD. Because both ISUs 102, 104 also have the same encryption key algorithms and the same X, the same encryption key is generated for both ISUs 102, 104. Once the encryption key is generated, the ISUs 102, 104 can communicate in a secure manner.

Figure 3:
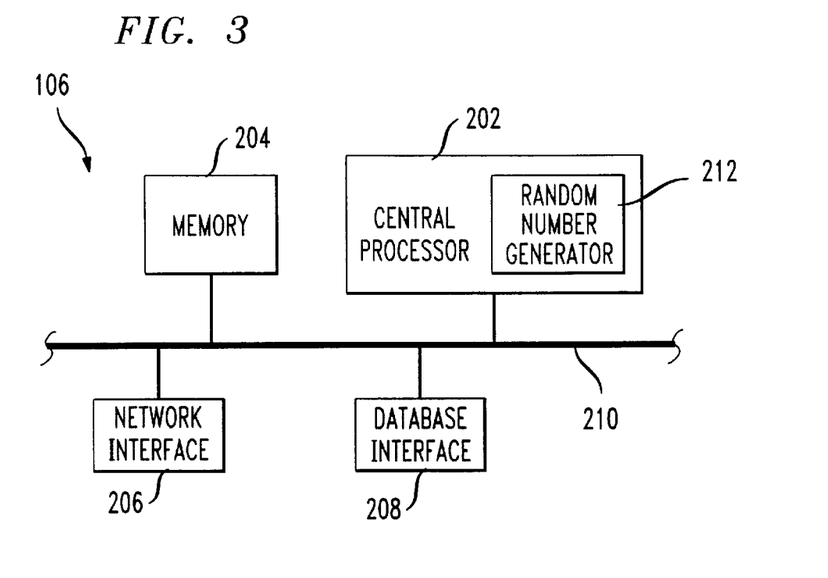
FIG. 3 is a block diagram of a control center.

FIG. 3 is a block diagram of the control center 106 which includes a central processor 202, a memory 204, a network interface 206, and a database interface 208. The above components are coupled together via signal bus 210.

As discussed earlier, the first number is periodically generated and broadcasted to all the ISUs 102, 104. Like the ISUs 102, 104 discussed above, the central processor 202 may store the last few first numbers in the memory 204 for use in generating the second SSD. As with the ISUs 102, 104, the central processor 202 uses either the most recent first number in the memory 204 or a first number identified in the SSD_A field to calculate the SSD.

When the authorization request is received from the ISU 102, the central processor 202 retrieves the identification information of the ISU 102 from the database 108 through the database interface 208. The ISU identification information may include the station ID, the smart card ID, and the A-key, for example. Other identification parameters may also be used for proper identification of the ISU 102 if desired. The central processor 106 validates the authorization request against the retrieved ISU identification information by comparing the retrieved data to the received data, for example. If valid, the central processor 106 transmits the authorizing signal to the requesting ISU through the network interface 206 to grant the authorization request.

After validating the authorization request, the central processor 202 also generates a second SSD based on the requesting ISU 102 information and the first number in the same manner as the ISU 102, discussed above. The central processor 202 generates the second number as discussed earlier, and transmits this second number to the ISU 104 via the network interface 206.

Figure 4:
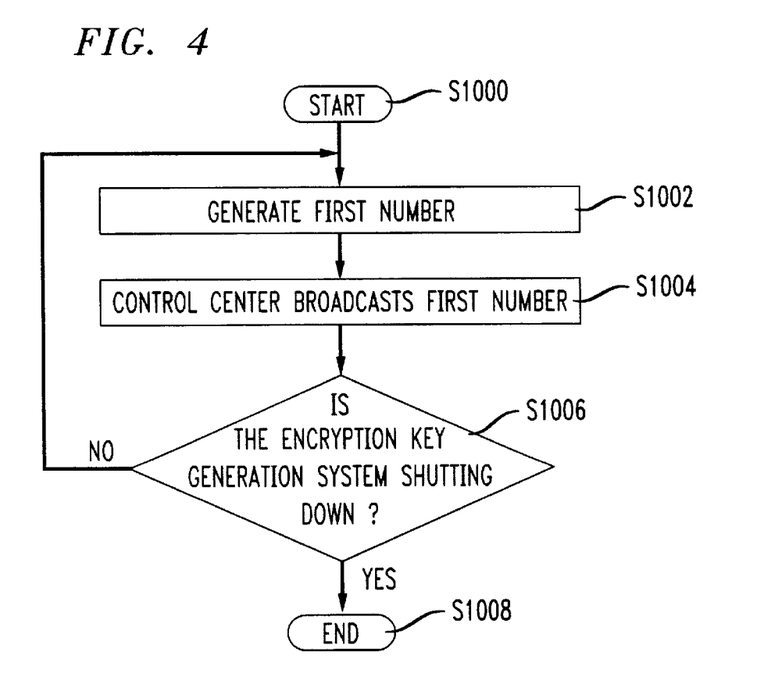
FIG. 4 is a flow chart of a process for distributing a first random number.

FIG. 4 is a flow chart showing a process for distributing a first number from the control center 106 to the ISUs 102, 104 of the encryption key generation system 1. The process starts at S1000 and immediately goes to step S1002. In step S1002, the central processor 202 generates a first number and goes to step S1004. In step S1004, the central processor 202 broadcasts the first number over the network 100 and goes to step S1006. In step S1006, the central processor determines whether the encryption key generation system 1 is shutting down. If shutting down, the central processor 202 goes to step S1008 and ends; otherwise, the control processor 202 returns to step S1002.

Figure 5:
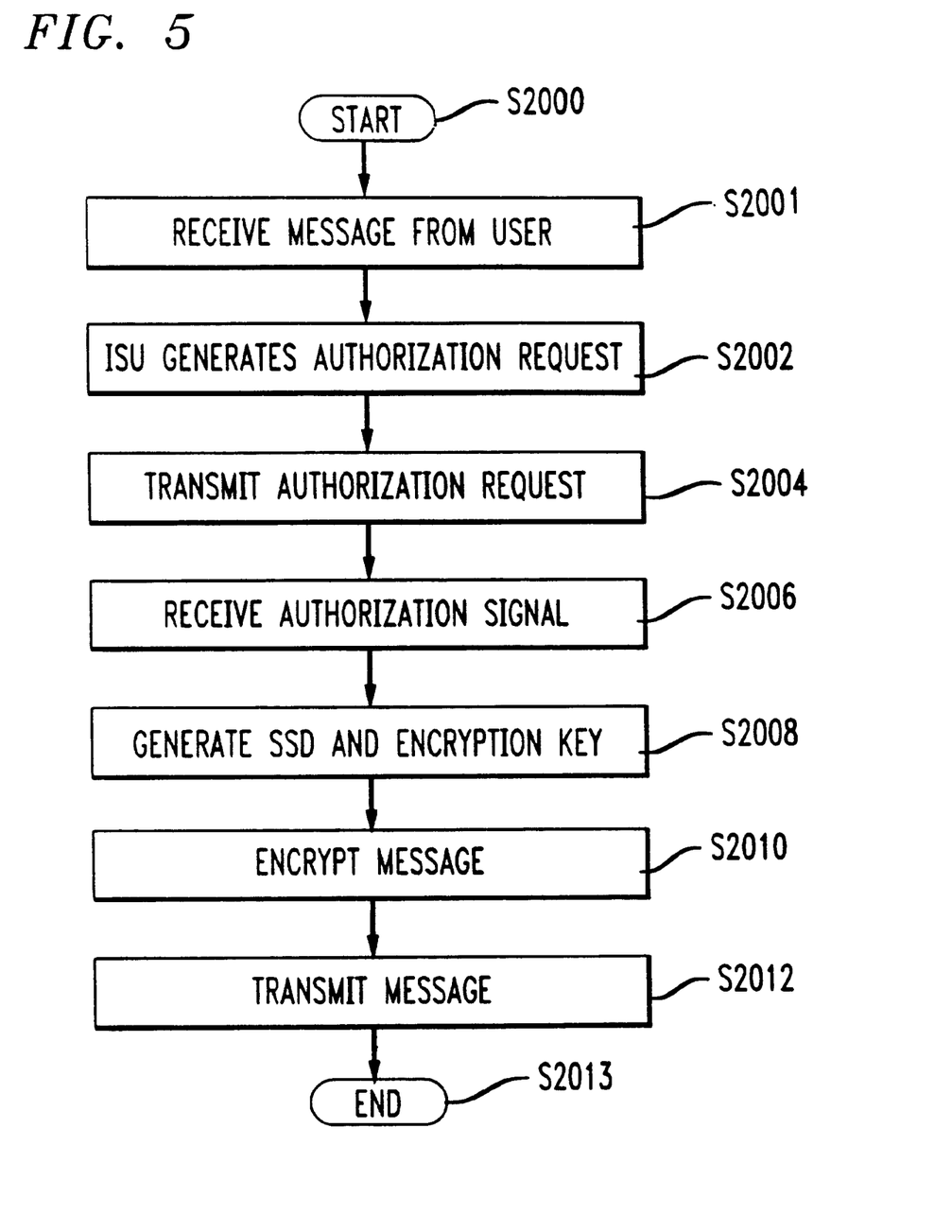
FIG. 5 is a flow chart showing an authorization request process.

FIG. 5 is a flow chart for an ISU process when a user initiates communications from the ISU 102 to the ISU 104. The process begins at S2000 and immediately goes to step S2001. In step S2001, the ISU 102 receives a message from a user to begin communications, and goes to step S2002. In step S2002, the ISU 102 generates an authorization request 202, and goes to step S2004. In step 2004 the ISU 102 transmits the authorization request across the network 100 to the control center 106, and goes to step S2006. In step S2006, the ISU 102 receives the authorization signal from the control center 106, and goes to step S2008. In step S2008, the ISU 102 generates the first SSD and encryption keys and goes to step S2010. In step S2010, the ISU 102 encrypts the user supplied message using the generated encryption key, and goes to step S2012. In step S2012, the ISU 102 transmits the encrypted message to the ISU 104, and goes to step S2013 to end the process.

Figure 6:
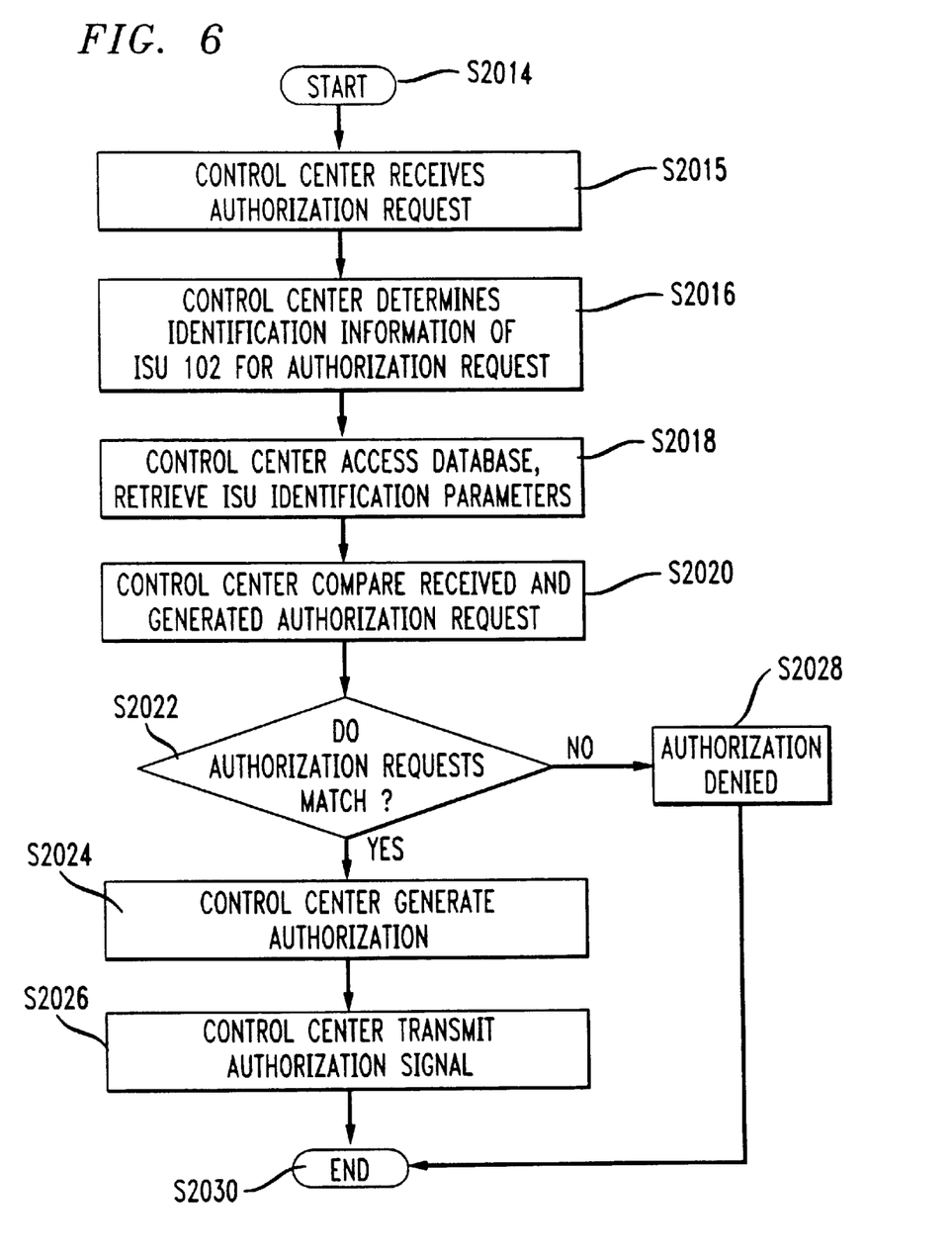
FIG. 6 is a flow chart showing an authorization authentication process.

FIG. 6 shows the authentication/authorization process at the control center 106. The process starts at step S2014 and immediately goes to step S2015. In step S2015, the central processor 202 receives an authorization request and goes to step S2016. In step S2016, the central processor 202 determines the identification information of the ISU 102, including the authentication key and the smart card ID, and goes to step S2018. In step S2018, the central processor 202 accesses security database 108 and retrieves the authentication key and the smart card ID for the requesting ISU 102, and goes to step S2020. In step S2020, the central processor 202 compares the retrieved ISU 102 identification parameters with the identification parameters contained in the authorization request, and goes to step S2022. In step S2022, the central processor 202 determines if the two sets of ISU 102 identification parameters match. If the ISU 102 identification parameters match, the central processor 202 goes to step S2024. In step S2024, the central processor 202 generates an authorization signal, and goes to step S2026. In step S2026, the central processor 202 transmits the authorization signal to the ISU 102 goes to step S2030 and ends. If the two sets of ISU 102 identification parameters do not match, the central processor 202 goes to step S2028. In step S2028, the central processor 202 sends an authorization denied signal to the ISU 102 and the process goes to step S2030 and ends.

Instead of ending the authorization process at step S2030 after denying authorization at step S2028, the central processor 202 may generate a new first number similar to step S1002, and transmits the new first number to the ISU 102 similar to step S1004. Equipped with the new first number, the ISU 102 can regenerate an authorization request similar to step S2002 and transmit the authorization request similar to step S2004. The central processor 202 repeats steps S2018–S2030. If ISU 102 authorization is denied a second time, then the authorization process ends. This second authorization cycle, also known as a unique challenge response, can be used when the ISU 102 was powered down or was otherwise unable to receive broadcasts of the first number, such as out of signal range, interference, garbled transmission, extreme temperatures or other weather-related factors, hardware anomalies, software anomalies or any other reason why the ISU 102 did not have the expected first number.

Figure 7:
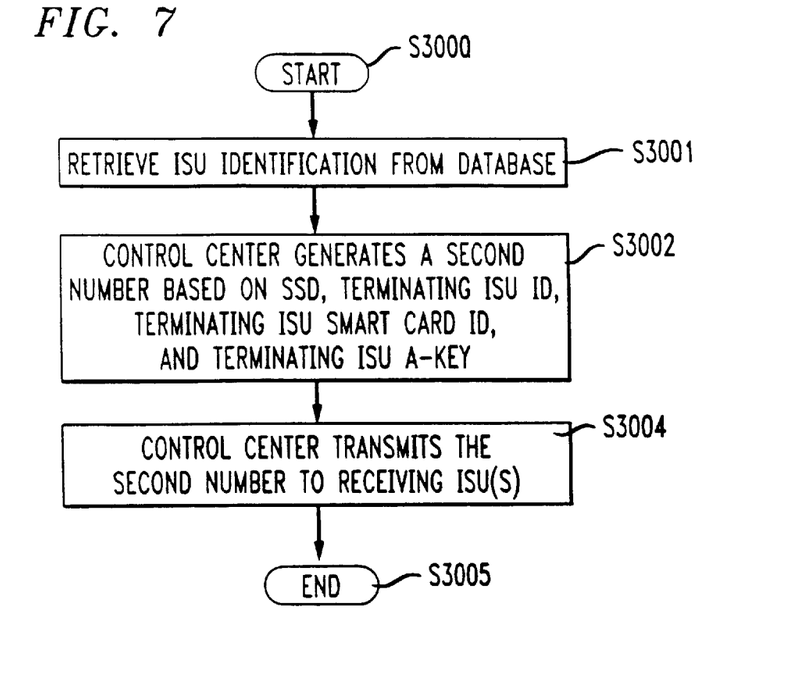
FIG. 7 is a flow chart of a process for distributing an SSD to a terminating ISU.

FIG. 7 is a flow chart showing the process of distributing the second number to the ISU 104. The process begins at step S3000 and immediately goes to step S3001. In step S3001, central processor 202 retrieves from the security database 108 the station ID, the smart card ID, and the A key of the ISU 104, and goes to step S3002. In step S3002, the central processor 202 generates a second number based on the information retrieved in step S3001 and a previously generated second SSD, and goes to step S3004. In step S3004, central processor 202 transmits the second number to ISU 104 and goes to step S3005 and ends.

Figure 8:
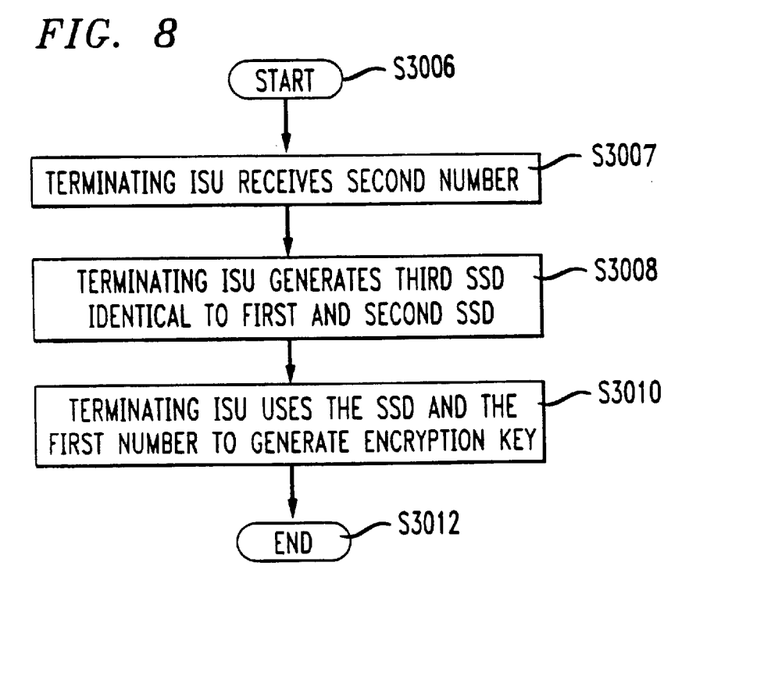
FIG. 8 is a flow chart of a process for receipt and regeneration of an SSD at a terminating ISU.

FIG. 8 is a flowchart showing a process of a terminating ISU, such as the ISU 104. The process starts at step S3006 and immediately goes to step S3007. In step S3007, the processor 302' receives the second number from the control center 106 and goes to step S3008. In step S3008, the processor 302' uses the second number to generate a third SSD which is identical to the first SSD and goes to step S3010. In step S3010, the ISU 104 processor 302' generates the encryption key based on the SSD and the first number using the same algorithm as used by an originating ISU such as the ISU 102 and goes to step S3012 and ends.

As will be understood by one of ordinary skill in the art, the present invention may be embodied in other specific forms without departing from the spirit or essential characteristics thereof. For example, this method for encryption key distribution can be used both in wireless and wire communications, in telephony, in cellular telephony, in video transmission, or any other transmission of information requiring encryption and deciphering. The ISU 102 may be a single unit that both transmits the request and receives the second number for reception and descrambling of video signals, for example. In this case, the ISU 102 is a pay-per-view video device and the control center 106 is a cable or satellite provider. Thus, the ISU 102 is both an ISU 102 and an ISU 104.

In another example, the ISU 102 may transmit secured information to a plurality of other ISUs in a point-to-multipoint data transmission. The same process of distributing the second number described above for one ISU is repeated for other ISUs. If the ISU's are cellular phones, the above described method and apparatus may be used to implement a secured conference call among multiple cellular telephone users. Although certain preferred embodiments have been shown and described, it should be understood that many changes and modifications may be made therein without departing from the scope of the appended claims.

Thus, while this invention has been described in conjunction with the specific embodiments outlined above, it is evident that many alternatives, modifications and variations will be apparent to those skilled in the art. Accordingly, the preferred embodiments of the invention as set forth above are intended to be illustrative, not limiting. Various changes may be made without departing from the spirit and scope of the invention as defined in the following claims.

What is claimed is:

1. A method for operating an encryption system, comprising:

broadcasting a first number;

receiving an authenticating request from a first individual subscriber unit (ISU);

generating a second number based on the authenticating request and information from a database, the database containing first ISU information and second ISU information; and transmitting the second number to a second ISU, wherein the first and the second ISUs generate a same encryption key, and the first ISU generates the encryption key based on the first number and the second ISU generates the encryption key based on the first and the second numbers.

2. The method of claim 1, wherein the generating the second number step comprises:

obtaining a second ISU identification information from the received authentication request;

retrieving first ISU information and second ISU information from the database; and combining the first and the second ISU information with the first number to form the second number.

3. The method of claim 2, wherein the combining step comprises:

generating shared secret data (SSD) based on the first ISU information and the first number; and transforming the SSD using the second ISU information resulting in the second number.

4. The method of claim 3, wherein the second number may be inverse-transformed into the SSD using the second ISU information.

5. The method of claim 1, wherein the broadcasting step comprises periodically generating and broadcasting the first number.

6. The method of claim 5, wherein the first number is a pseudo random number.

7. The method of claim 5, wherein the broadcasting period is one of seconds, minutes, hours, days and months.

8. The method of claim 1, wherein the authentication request includes information identifying the first number.

9. The method of claim 8, wherein the first number is identified by a time stamp.

10. The method of claim 1, the first and second ISU information including at least one of:

an ISU identification number;

a smart card identification number; and an ISU authentication key.

11. The method of claim 1, wherein the first ISU and the second ISU are the same unit.

12. An encryption system that includes at least one ISU comprising:

a database; and a central controller coupled to the ISU and the database, wherein the central controller broadcasts a first number, receives an authentication request from a first ISU of the at least one ISU, generates a second number based on the authentication request and first ISU information and second ISU information retrieved from the database, and transmits the second number to a second ISU of the at least one ISU, the first ISU generating an encryption key based on the first number and the second ISU generating the encryption key based on the first and second numbers.

13. The encryption system of claim 12, wherein the first ISU and the second ISU are the same unit.

14. The encryption system of claim 12, wherein the central controller obtains a second ISU identification information from the received authentication request, and combines the first and the second ISU information with the first number to form the second number.

15. The encryption system of claim 12, wherein the central controller generates shared secret data (SSD) based on the first ISU information and the first number, and transforms the SSD using the second ISU information resulting in the second number.

16. The encryption system of claim 15, wherein the second ISU inverse transforms the second number into the SSD.

17. The encryption system of claim 12, wherein the first number is a pseudo random number.

18. The encryption system of claim 12, wherein the broadcast of the first number is periodic.

19. The encryption system of claim 18, wherein the broadcast period is one of seconds, minutes, hours, days and months.

20. The encryption system of claim 12, wherein the authentication request includes information identifying the first number.

21. The encryption system of claim 20, wherein the first number is identified by a time stamp.

\* \* \* \* \*